(12) United States Patent
Modrie et al.

(10) Patent No.: US 7,248,630 B2
(45) Date of Patent: Jul. 24, 2007

(54) ADAPTIVE EQUALIZER OPERATING AT A SAMPLING RATE ASYNCHRONOUS TO THE DATA RATE

(75) Inventors: David Modrie, Louvain (BE); Rob Otte, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 515 days.

(21) Appl. No.: 10/495,941

(22) PCT Filed: Oct. 30, 2002

(86) PCT No.: PCT/IB02/04607
§ 371 (c)(1),
(2), (4) Date: May 18, 2004

(87) PCT Pub. No.: WO03/045024
PCT Pub. Date: May 30, 2003

(65) Prior Publication Data
US 2005/0111540 A1 May 26, 2005

(30) Foreign Application Priority Data
Nov. 21, 2001 (EP) ................... 01402988

(51) Int. Cl.
*H03H 7/30* (2006.01)
*H04L 27/06* (2006.01)

(52) U.S. Cl. .................... 375/233; 375/340; 375/355

(58) Field of Classification Search ............. 375/232, 375/233, 229, 230; 370/286; 708/313, 322, 708/323
See application file for complete search history.

(56) References Cited

U.S. PATENT DOCUMENTS

| 5,200,811 | A | * | 4/1993 | Cho ..................... 375/240.25 |
| 5,999,355 | A | | 12/1999 | Behrens et al. |
| 6,240,128 | B1 | * | 5/2001 | Banerjea et al. ............. 375/222 |
| 6,411,661 | B1 | * | 6/2002 | Nguyen et al. ............. 375/336 |
| 6,717,537 | B1 | * | 4/2004 | Fang et al. ................. 341/143 |
| 6,912,258 | B2 | * | 6/2005 | Birru .......................... 375/340 |
| 6,975,689 | B1 | * | 12/2005 | McDonald et al. ......... 375/316 |
| 7,110,448 | B2 | * | 9/2006 | Bergmans et al. .......... 375/233 |
| 2002/0012324 | A1 | * | 1/2002 | Hayward .................... 370/286 |
| 2004/0013083 | A1 | * | 1/2004 | Sobchak et al. ............ 370/203 |
| 2004/0208245 | A1 | * | 10/2004 | MacInnis et al. ...... 375/240.15 |
| 2004/0213362 | A1 | * | 10/2004 | Townshend ................. 375/340 |

* cited by examiner

*Primary Examiner*—Mohammed Ghayour
*Assistant Examiner*—Abdellah Lamane

(57) ABSTRACT

The invention relates to an LMS-based asynchronous receiver for digital transmission and recording systems. The receiver comprises a digital adaptive equalizer (EQ) for receiving a received sequence rn and for delivering an equalized sequence yn. The equalizer (EQ) operates at the sampling rate 1/Ts, asynchronous to the data rate 1/T. An equalizer adaptation method using LMS techniques is described for adapting equalizer taps asynchronously to the data rate via a control loop. A first sampling rate converter (SRC1) performs timing recovery at the data rate 1/T after equalization on the equalized sequence yn. A second sampling rate converter (SRC2) is provided for converting a delayed version of the received sequence rn into an intermediate control sequence ik at the data rate 1/T.

10 Claims, 2 Drawing Sheets

Figure 1:
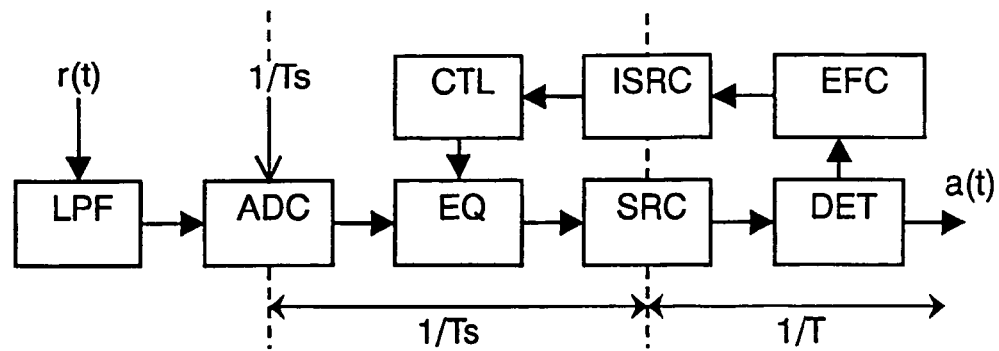

ADAPTIVE EQUALIZER OPERATING AT A SAMPLING RATE ASYNCHRONOUS TO THE DATA RATE

The invention generally relates to digital transmission and recording systems. In particular, it relates to a receiver for delivering a data sequence $a_k$ at a data rate $1/T$ from a received sequence $r_n$ sampled at a clock rate $1/Ts$, asynchronously to the data rate $1/T$, the receiver comprising:

an adaptive equalizer for delivering an equalized sequence $y_n$ from said received sequence $r_n$, said equalizer operating at the clock rate $1/Ts$ and having an equalizer coefficient vector $W_n$ controlled by a control vector sequence $S_n$ via a control loop, a first sampling rate converter for converting said equalized sequence $y_n$ to an equivalent input sequence $x_k$ to be fed to an error generator at the data rate $1/T$ an error generator for delivering the data sequence $a_k$ from said input sequence $x_k$ and an error sequence $e_k$ to be used in the control loop.

The invention also relates to a digital system comprising a transmitter for transmitting a digital sequence via a channel and a receiver for extracting said digital sequence from said channel, wherein said receiver is a receiver as described above.

The invention further relates to a an equalizer adaptation method for said receiver. It finally relates to a computer program product for such a receiver and to a signal for carrying out said computer program.

The invention applies to a wide variety of asynchronous receivers for use in digital transmission and recording systems. It is particularly advantageous in optical recording systems such as the DVR (Digital Video Recording) system.

U.S. Pat. No. 5,999,355 describes an asynchronous receiver such as the one mentioned in the opening paragraph. In accordance with the cited patent, the equalizer is a tapped delay line (Finite Impulse Response filter) with a tap spacing of Ts seconds, and control of the equalizer is based on the classical LMS (Least Mean Square) algorithm. That is to say, updates of the equalizer tap values are produced by correlating the tap sequences with a suitable error sequence. Classical LMS techniques normally apply to synchronous receivers wherein error and tap sequences have the same sampling rate and are phase synchronous. The asynchronous receiver described in the cited patent thus comprises at least two provisions in order that error and tap sequences have the same sampling rate and are phase synchronous. The latter condition implies that any latency in the error sequence should be matched by delaying the tap sequences accordingly. The aforementioned two provisions include an inverse sampling rate conversion (ISRC) for converting the synchronous error sequence at the data rate $1/T$ into an equivalent error sequence of sampling rate $1/Ts$, and delay means to provide delayed versions of the equalizer tap sequences to match the "round-trip" delay arising in the formation of the equivalent error sequence from the equalizer output. This "round-trip" delay is time varying because both SRC and inverse SRC introduce a time-varying delay. The matching delay represents the expected or average value of the "round-trip" delay. Discrepancies between the "round-trip" and matching delays tend to cause the adaptation scheme to converge to an erroneous solution. Furthermore, since the matching delay needs not be an integer number of symbol intervals Ts, implementation of the matching delay may require some form of interpolation. This adds to the complexity of the system. The inverse SRC also adds to this complexity so that overall complexity of the adaptation-related circuitry is considerably larger than in synchronous LMS-based adaptation.

It is an object of the invention to provide an asynchronous receiver using an alternative adaptation topology that circumvents the above mentioned disadvantages.

In accordance with the invention, a receiver as mentioned in the opening paragraph is provided, wherein the control loop comprises:

a second sampling rate converter for converting a delayed version of said received sequence $r_n$ into an intermediate control sequence $i_k$ at the data rate $1/T$, control information production means for deriving a synchronous control vector sequence $Z_k$ at the data rate $1/T$ from the error sequence $e_k$ and said intermediate control sequence $i_k$, and temporal interpolation means for deriving the control vector sequence $S_n$ from said synchronous control vector sequence $Z_k$.

The input of the equalizer is converted to the data rate domain after it has been delayed with a predefined delay. The predefined delay is not time-varying and well known. It is the delay through the equalizer; if the number of taps is denoted 2M+1 (index varying from −M to M) the delay is equal to M+ extra pipelining delays. Once both signals, i.e. the signals at the output of each sampling rate converters are in the data rate domain, the equalizer coefficient updates can be easily computed.

In accordance with a preferred embodiment of the invention, the temporal interpolation means include a bank of latches performing zeroth-order interpolation. The possibility of using latches is based on the recognition that the tap settings produced by the control loop fluctuate only slowly and with small steps. As a result, they can be re-sampled accurately with very simple means. A bank of latches suffices for the conversion from the synchronous to the asynchronous domain.

In accordance with another embodiment of the invention, the control loop further comprises spatial conversion means for converting a given initially T-spaced sequence generated within the control loop into an equivalent Ts-spaced sequence, so that the taps of the control vector sequence at the output of the control loop are Ts-spaced. The control signals are produced in the synchronous domain. Therefore, they pertain to controlling a T-spaced equalizer. Since the equalizer operates at the sampling rate $1/Ts$, it actually has a tap spacing of Ts time units. Thus, the invention provides spatial conversion means for converting the T-spaced information into Ts-spaced information.

Figure 2:
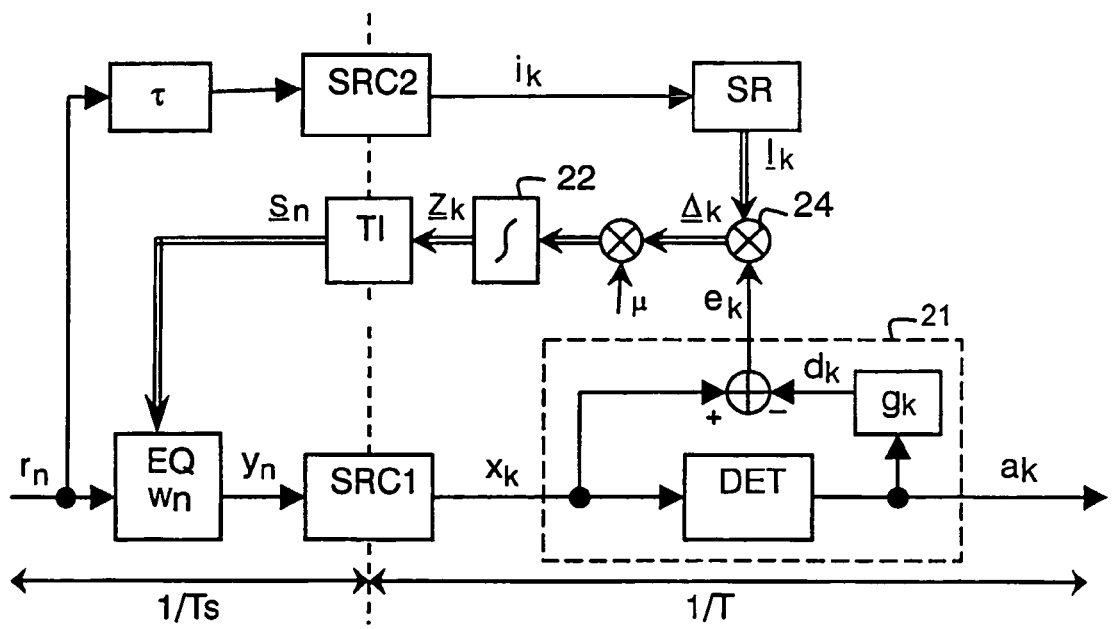
Figure 3:
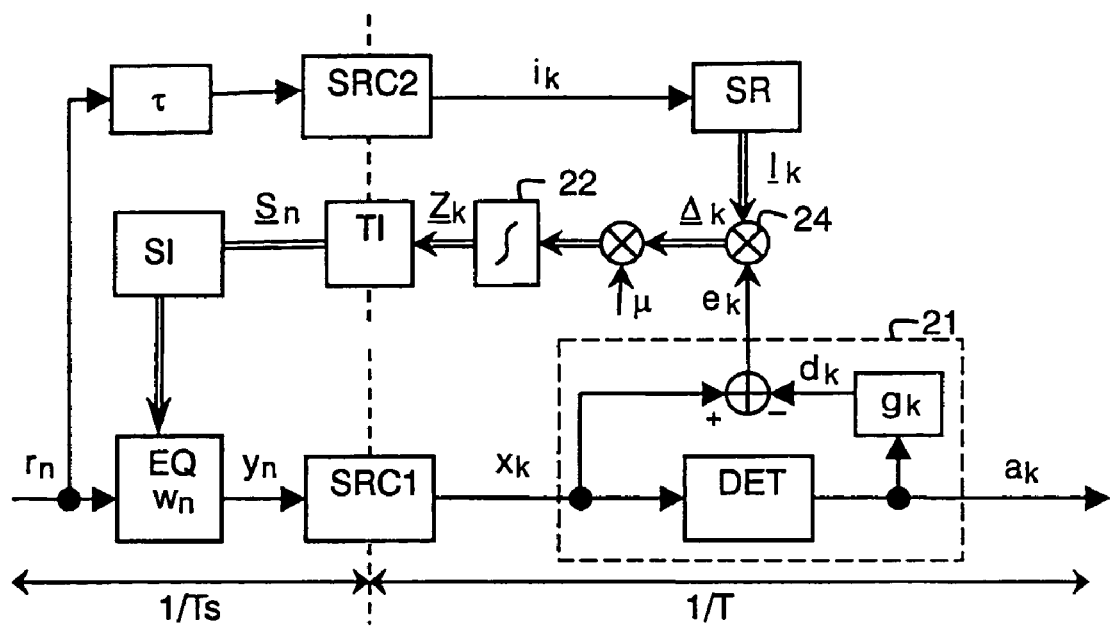
Figure 4:
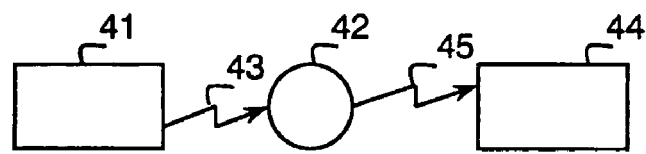

The invention and additional features, which may be optionally used to implement the invention, are apparent from and will be elucidated with reference to the drawings described hereinafter and wherein:

FIG. 1 is a functional block diagram illustrating a generic asynchronous receiver topology for use in digital transmission and recording systems, FIG. 2 is a functional block diagram illustrating a receiver topology in accordance with the invention, FIG. 3 is a functional block diagram illustrating a receiver topology in accordance with a first embodiment of the invention, FIG. 4 is a schematic block diagram illustrating a digital system in accordance with the invention.

The following remarks relate to reference signs. Like functional entities are usually indicated by like block labels in all Figures. Hereinafter we will also adopt the convention that vectors are denoted by underlined symbols, and that the symbols k and n refer to sequences of sampling rate $1/T$ and 1/Ts, respectively. For example, according to this convention the notation $a_k$ refers to a scalar sequence of sampling rate 1/T, and the notation $S_n$ refers to a vector sequence of sampling rate 1/Ts. The length of a vector will be denoted by the symbol N and a subscript indicating the symbol used for the vector. Accordingly, for example, the length of the vector $S_n$ is denoted Ns.

FIG. 1 illustrates a generic topology of an asynchronous baseband receiver for digital transmission and recording systems. The receiver generates a data sequence $a_k$ at a data rate 1/T from a received signal r(t). The received signal r(t) is applied to an analog low pass filter LPF whose main function is to suppress out-of-band noise. The LPF output is digitized by an analog-to-digital converter ADC which operates at a crystal-controlled free-running sampling rate 1/Ts, asynchronously to the data rate 1/T, which is high enough to prevent aliasing. The ADC output is applied to an equalizer EQ which serves to condition inter-symbol interference and noise. The equalizer operates at the sampling rate 1/Ts, i.e. asynchronously to the data rate 1/T. A sampling-rate converter SRC produces an equivalent synchronous output which serves as the input of a bit detector DET for delivering the data sequence $a_k$. The SRC forms part of a timing-recovery loop which is not depicted explicitly in FIG. 1. Asynchronous and synchronous clock domains are indicated in FIG. 1 with the symbols 1/Ts and 1/T, respectively.

To cope with variations of the system parameters, the equalizer EQ often needs to be adaptive. To this end, error information is extracted from the bit detector DET by an error formation circuit EFC and is used to control (update) the equalizer taps via a control module CTL. Error formation occurs in the synchronous (1/T) clock domain, while control necessarily occurs in the asynchronous (1/Ts) domain. In between, an inverse sampling-rate converter ISRC is required. In practice, the equalizer is often a tapped delay line (Finite Impulse Response filter) with a tap spacing of Ts seconds.

Existing asynchronous adaptation techniques are based on LMS (Least Mean Square) algorithms. With LMS, update information for the equalizer taps is derived by cross-correlating the tap sequences with a suitable error sequence. For this to work, the tap and error signals need to be synchronous both in sampling rate and in phase. The first condition is met via the ISRC. The second one requires that the total latency of SRC, bit-detector, error formation circuit, and ISRC is matched by delaying the tap signals accordingly, prior to cross-correlation. Both ISRC and delay matching add to the complexity of the solution. Delay matching, moreover, may not be accurate because of the time-varying nature of the latency of SRC and ISRC. As a result, adaptation performance may degrade.

FIG. 2 shows a receiver in accordance with the invention comprising an adaptation topology that overcomes the disadvantages mentioned before. Only a part of the data receiver is shown in FIG. 2, namely the part relevant to digital equalizer adaptation. In particular, the timing-recovery subsystem of the receiver, which controls the sampling-rate converter SRC and the temporal interpolation means TI, is not shown. The receiver comprises an adaptive equalizer EQ, a pair of sampling-rate converters SRC1 and SRC2, and a detector DET to produce a data sequence $a_k$ from a received input sequence $r_n$. The detector DET is part of an error generator 21 which generates an error sequence $e_k$ to be used in the equalizer's control loop from the bit decisions generated by the bit detector. Adaptation of the equalizer is based on LMS techniques as described, for example, in the book by J. W. M. Bergmans: "Digital Baseband Transmission and Recording", published by Kluwer Academic Publishers, Boston, 1996, denoted [ref.]. Central to these techniques is that tap update information is produced by correlating the tap signals (received sequence $r_n$) with the error signals. Error and tap signals should have the same sampling rate, and should moreover be phase synchronous, any latency in the error signal should be matched by delaying the tap signals accordingly.

In FIG. 2, $r_n$ denotes the sequence obtained by periodic sampling of e.g. an analog replay signal from a recording channel. Sampling is performed at a free-running clock rate 1/Ts which is generally not equal to the data rate 1/T. The sequence $r_n$ is passed through an equalizer EQ having Ts-spaced taps $w_n$ for producing an equalized sequence $y_n$ at its output. Preferably, the equalizer EQ is an FIR (Finite Impulse Response) transversal filter, but it can be any equalizer that contains a linear combiner. The purpose of the equalizer is to shape the response of the (e.g. recording) channel to a prescribed target response and condition the noise spectrum. The equalizer EQ is followed by a sample rate converter SRC which transforms the Ts-spaced equalized sequence $y_n$ into an equivalent T-spaced sequence $x_k$ to be provided at the input of an error generator 21 comprising a bit detector DET. The T-spaced input sequence $x_k$ is ideally synchronous to the data rate 1/T of the channel data sequence $a_k$. Actually, the bit detector DET produces estimates $\hat{a}_k$ of the channel bits $a_k$. Assuming that the bit detector produces correct decisions, the data sequence $a_k$ and its estimate $\hat{a}_k$ are identical. Therefore, the outputs of the bit detector are denoted $a_k$ in all Figures. Occasional bit errors do not significantly affect the performance of the system. Alternatively, at the beginning of transmission, a predetermined data sequence (often referred to as preamble) may precede the actual data in order for initial adaptation to be based on a replica of this predetermined data sequence, which can be synthesized locally in the data receiver without any bit errors. It is common practice to perform the initial stage of adaptation in this so-called 'data-aided' mode of operation, and to switch to the 'decision-directed' mode of operation as depicted in FIG. 2 once adaptation loops have converged. While not depicted explicitly in FIG. 2, it is to be understood that the present description also pertains to this 'data-aided' mode of operation.

The remaining part of FIG. 2 illustrates the mechanism of the control loop for adaptively updating the equalizer tap coefficient vector sequence $W_n$ using LMS techniques in accordance with the invention. All digital operations involved in the control loop can be realized e.g. by a microprocessor carrying out a suitable computer program. The thick arrows between blocks indicate vector signal transfers while scalar signals are indicated by thin arrows. Therefore, the control loop comprises:

- a second sampling rate converter SRC2 for converting a delayed version of the received sequence $r_n$ into an intermediate control sequence $i_k$ at the data rate 1/T, this second SRC, denoted SRC2, is preferably the same as the first SRC1,
- control information production means 22 for deriving a synchronous control vector sequence $Z_k$ at the data rate 1/T from the error sequence $e_k$ and the intermediate control sequence $i_k$, and
- temporal interpolation means TI for deriving the control vector sequence $S_n$ from said synchronous control vector sequence $Z_k$.

In FIG. 2, the control vector sequence $S_n$ directly controls the equalizer, i.e. the equalizer tap vector sequence $W_n$ simply coincides with $S_n$.

The synchronous control vector sequence $Z_k$ produced by the control information production means is formed by a bank of Nz integrators 22, whose input is derived from a cross product 24 $e_k \cdot I_k$, where $I_k$ is an intermediate vector sequence consisting of Ni intermediate sequences. Preferably, all the vector lenghts are equal. Therefore, Nz=Ni=2M+1. The number 2M+1 being the number of taps $w_n$ in the equalizer EQ. This intermediate vector sequence $I_k$ is derived from the received sequence $r_n$. A predefined delay $\tau$ is applied to the received sequence $r_n$. The delayed version of the received sequence $r_n$ is fed to a sampling rate converter SRC2 to form an intermediate sequence $i_k$, prior to a shift register SR performing a series-to-parallel conversion to form the intermediate vector sequence $I_k$ from the intermediate sequence $i_k$.

The input of the equalizer is thus converted to the data rate domain after it has been delayed with a predefined delay. The predefined delay is not time-varying and well known. Once both signals, i.e. the signals at the output of each sampling rate converter are in the data rate domain, the equalizer coefficient updates can be easily computed. The adaptation scheme is detailed hereafter.

The variables at the output of the integrators 22, denoted $Z_k^j$, obey the following equation:

$$Z_{k+1}^j = Z_k^j + \mu \Delta_k^j, \quad j:-M,\ldots,M \qquad (1)$$

where:

$Z_k^j$ is the output of the j-th integrator at instant k, $\mu$ is a small scaling factor (often referred to as step size) which determines closed-loop time constants, $\Delta_k^j$ is a tap-error estimate at iteration k, and 2M+1 is the number of taps of the equalizer.

According to the LMS scheme, the estimate $\Delta_k^j$ is given by:

$$\Delta_k^j = e_k \cdot i_{k-j}, \quad j:-M,\ldots,M \qquad (2)$$

where:

$e_k$ is the error between the SRC output and a (delayed version of) desired detector input $d_k = (a*g)_k$, with:

$g_k$ is the target response (of a filter G) for the equalizer adaptation $i_{k-j}$ is a delayed version of the received sequence $r_n$ converted into the data rate 1/T.

For the sake of completeness it is mentioned that equation (2) and FIG. 2 describe only one of the various possible manners to derive tap-error estimates $\Delta_k^j$ from the error sequence $e_k$ and the input sequence $r_n$. For example, either of the two sequences $e_k$ and $r_n$ can be strongly quantized so as to simplify implementation, and the multiplication in (2) can be replaced by a selective-update mechanism.

FIG. 2 shows that the synchronous control vector sequence $Z_k$ at the output of the integrators is updated every T seconds (synchronous domain), while the equalizer coefficient vector $W_n$ needs to be updated every Ts seconds, since the equalizer operates in the asynchronous domain. The necessary time-base conversion is performed through the temporal interpolation means TI for deriving an asynchronous control vector sequence $S_n$ at the sampling rate 1/Ts from the synchronous control vector sequence $Z_k$ at the output of the bank of integrators. Since tap values change only slowly with respect to both sampling rates, the temporal interpolation can be done in the simplest conceivable manner, e.g. via a bank of latches performing zeroth-order interpolation. When $T_s$ deviates too much from T, an additional issue is raised, which requires an additional functionality, called spatial interpolation. The additional functionality is described with reference to FIG. 3.

The equalizer has a tap spacing of Ts seconds, i.e. it acts to delay the input sequence in steps of Ts seconds to obtain the successive tap signals, which are then combined linearly with weights $w_n^j$, j: -M,...,M, which are defined by the coefficient vector sequence $W_n$. The control vector sequence $s_n$ at the output of the bank of integrators, however, pertains to a T-spaced equalizer, i.e. successive components $s^j$, j: -M,...,M, of $s_n$ are meant in principle as weights for an equalizer with tap spacing T. The discrepancy between this nominal tap spacing of T seconds and the actual tap spacing of Ts seconds results in a degradation of adaptation performance, both in terms of the steady-state solution with which the equalizer settles and in terms of a degradation of loop efficiency. As a result, the topology of FIG. 2 is mainly suitable for near-synchronous applications, e.g. applications in which 1/Ts and 1/T are close to each other, and preferably differ less than some 20-40%. This condition is met in many practical systems, e.g. in most channel ICs (Integrated Circuits) for hard disk drivers.

In order to be able to use the invention within a larger range of applications, an improvement of the scheme described in FIG. 2 is proposed in FIG. 3. According to this improvement, the control loop further comprises spatial conversion means for deriving the equalizer coefficient vector sequence $W_n$ from the asynchronous control vector sequence $S_n$ at the output of the temporal interpolation means. This results in converting an initially T-spaced sequence generated within the control loop into an equivalent Ts-spaced sequence for controlling the equalizer coefficient vector $W_n$. In FIG. 3, these spatial conversion means are indicated with the symbol SI. Since the update variables $s_n^j$ describe the coefficients of a T-spaced equalizer, it is indeed necessary to convert this T-spaced information into Ts-spaced information. This necessitates interpolation on the coefficients $s^j$, which is performed by the Spatial Interpolator block SI. Conceptually, the update variables $s^j$ are T-spaced samples of an underlying time-continuous equalizer filter whose impulse response is denoted w(t), i.e. $s^j = w(jT)$, j: -M,...,M. Assuming that w(t) were available, we would have to resample it at positions $t_i = i \times T_s$, for i: -M,...,M, in order to generate the necessary equalizer coefficients $w^j = w(i \times T_s)$. The variable t does not indicate time but position here, and assumes continuous values from a certain interval (the span of the filter). In the same sense, i is a position index that is independent of time, i.e., $t_i$ is fully determined by i and does not change over time. However, since only T-spaced samples of w(t), namely $s^j$, are available, interpolation of these samples must be used to produce the Ts-spaced variables $w^j$.

One of the simplest forms of interpolation is linear interpolation, which is attractive from a computational point of view, but other forms of interpolation can be considered such as e.g. nearest-neighbor interpolation, which is even simpler. The re-sampling positions $t_i = i \times T_s$ can be equivalently written as $t_i = (m_i + c_i)T$, where $0 \leq c_i < 1$, and $$m_i = \left\lfloor i\frac{T_s}{T} \right\rfloor, \qquad c_i = i\frac{T_s}{T} - m_i. \qquad (3)$$

As $c_i$ varies between 0 and 1, $t_i$ varies between $m_i T$ and $(m_i+1)T$, and w(t) varies between $w(m_i T) = s_*^m_i$ and $w((m_i +$ $1)T) = s_i^{m+1}$. According to one method of linear interpolation, the value of w(t) at position $t_i$ is then calculated as:

$$w^i = w(t_i) = (1-c_i) \times s^{m_i} + c_i \times s^{m_i+1} \quad (4)$$

With the aid of (4), the spatial interpolator SI of FIG. 3 converts the T-spaced taps $s^j$ at the output of the latch to Ts-spaced tap settings $w^i$ representing the equalizer taps. In order to perform this conversion it is necessary to know, or estimate, the ratio Ts/T of the channel bit rate to the sampling rate as indicated in equation (3). However, an estimate of this ratio is already available within the sampling rate converter SRC1 of FIG. 3. The SRC re-samples the Ts-spaced sequence $y_n$ at instants $t_k = kT$, which can be re-written as $t_k = (m_k + \mu_k)Ts$.

In the presence of phase errors, the difference between successive sampling instants varies from the nominal value of T according to $t_k - t_{k-1} = T + \tau_k T$, where $\tau_k$ is a phase error in the reconstructed T-spaced clock. Then we arrive at the following equation:

$$(m_k - m_{k-1}) + (\mu_k - \mu_{k-1}) = \frac{T}{T_s} + \tau_k \frac{T}{T_s} \quad (5)$$

The timing-recovery loop that controls the SRC1 acts to force the average of the phase error to zero. Therefore, the average of the quantity on the left hand side of (5) will settle on the actual value of T/Ts, or the inverse of the ratio that is needed for linear interpolation.

FIG. 4 shows an example of a system in accordance with the invention comprising a receiver as shown in FIG. 2 or 3. The system can be, for example, a digital recording system. It comprises a recorder 41 for recording a digital sequence 43 on a recording medium 42 and a receiver 44 for reading the recorded sequence 45 from said recording medium. The recording medium 42 may be, for example, an optical disc.

The drawings and their description hereinbefore illustrate rather than limit the invention. It will be evident that there are numerous alternatives which fall within the scope of the appended claims. In this respect, the following closing remarks are made.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude the fact that a function is carried out by an assembly of items of hardware or software, or both.

The invention claimed is:

1. A receiver for delivering a data sequence ($a_k$) at a data rate 1/T from a received sequence ($r_n$) sampled at a clock rate 1/Ts, asynchronously to the data rate 1/T, the receiver comprising:
   an adaptive equalizer for delivering an equalized sequence ($y_n$) from said received sequence ($r_n$), said equalizer operating at the clock rate 1/Ts and having an equalizer coefficient vector ($W_n$) controlled by a control vector sequence ($s_n$) via a control loop;
   a first sampling rate converter for converting said equalized sequence ($y_n$) to an equivalent input sequence ($x_k$) to be fed to an error generator at the data rate 1/T; and
   an error generator for delivering the data sequence ($a_k$) from said input sequence ($x_k$) and an error sequence ($e_k$) to be used in the control loop, wherein said control loop comprises:
   a second sampling rate converter for converting a delayed version of said received sequence ($r_n$) into an intermediate control sequence ($i_k$) at the data rate 1/T;
   control information production means for deriving a synchronous control vector sequence ($Z_k$) at the data rate 1/T from the error sequence ($e_k$) and said intermediate control sequence ($i_k$); and
   temporal interpolation means for deriving the control vector sequence ($s_n$) from said synchronous control vector sequence ($Z_k$).

2. The receiver as claimed in claim 1, wherein said temporal interpolation means includes zeroth-order interpolation means.

3. The receiver as claimed in claim 2, wherein said zerothorder interpolation means comprises at least a latch.

4. The receiver as claimed in claim 1, wherein the control loop further comprises spatial conversion means for converting a given initially T-spaced sequence generated within the control loop into an equivalent Ts-spaced sequence for controlling said equalizer coefficient vector ($W_n$).

5. The receiver as claimed in claim 4, wherein said spatial conversion means is arranged to perform a linear interpolation.

6. The receiver as claimed in claim 4, wherein said spatial conversion means is arranged to perform a nearest-neighbor interpolation.

7. The receiver as claimed in claim 4, wherein said spatial conversion means includes spatial interpolation means for deriving the equalizer coefficient vector ($W_n$) from the control vector sequence ($s_n$) at the output of the temporal interpolation means.

8. A digital system comprising a transmitter for transmitting a digital sequence via a channel support and a receiver for extracting said digital sequence from said channel support, wherein said receiver is a receiver as claimed in claim 1.

9. In a receiver comprising an adaptive equalizer, an equalizer adaptation method of receiving a sequence ($r_n$), sampled at a clock rate 1/Ts, and of delivering a data sequence ($a_k$) at a data rate 1/T, the method comprising the following steps:
   an adaptive equalizing step of delivering an equalized sequence ($y_n$) from the received sequence ($r_n$) using an equalizer coefficient vector ($W_n$);
   a first sampling rate converting step (SRC1) of converting said equalized sequence ($y_n$) to an equivalent input sequence ($x_k$) to be processed through an error generating step at the data rate 1/T;
   an error generating step of generating an error sequence ($e_k$) and the data sequence ($a_k$) at the data rate 1/T from said input sequence ($x_k$); and
   a control step of generating a control vector sequence ($s_n$) from the error sequence ($e_k$) and the received sequence ($r_n$), for controlling said equalizer coefficient vector ($W_n$), wherein said control step comprises the sub-steps of:
   a second sampling rate converting step for converting a delayed version of said received sequence ($r_n$) into an intermediate control sequence ($i_k$) at the data rate 1/T;

a control information production step for deriving a synchronous control vector sequence ($Z_k$) at the data rate 1/T from the error sequence ($e_k$) and the data sequence ($i_k$); and a temporal interpolation step (TI) for deriving the control vector sequence ($s_n$) from said synchronous control vector sequence ($Z_k$).

10. A computer readable medium containing a program including a set of instructions which when loaded into a receiver, causes the receiver to carry out the method as claimed in claim 9.

* * * * *